Aug. 8, 1961  A. J. BARTA  2,994,914
APPARATUS FOR MIXING THERMOPLASTIC MATERIALS WITH FILLERS
Filed March 13, 1959  2 Sheets-Sheet 2

INVENTOR.
ANTHONY J. BARTA
BY
Andrew & Starkes
Attorneys

United States Patent Office 2,994,914
Patented Aug. 8, 1961

2,994,914
APPARATUS FOR MIXING THERMOPLASTIC MATERIALS WITH FILLERS
Anthony J. Barta, Glenbeulah, Wis., assignor to Plymouth Industrial Products, Inc., Plymouth, Wis., a corporation of Wisconsin
Filed Mar. 13, 1959, Ser. No. 799,265
1 Claim. (Cl. 18—2)

This invention relates to an apparatus for mixing thermoplastic materials with fillers.

Heretofore, to the knowledge of the inventor, it has not been found possible to efficiently mix thermoplastic materials with inorganic materials, such as glass or asbestos fibers. This has been especially true when some of the newer thermoplastic materials, such as polyethylene, were involved. Polyethylene, for example, has a relatively high viscosity at its melt point, making it exceedingly difficult to disperse fibers or other binders therein.

The present invention solves the foregoing and other problems, and provides an apparatus whereby dry or unmelted thermoplastic pellets are mixed with the desired fibers and/or fillers, and the dry substantially particilized mix is then melted, thoroughly mixed and continuously discharged for use.

The accompanying drawings illustrate the best mode presently contemplated by the inventor for carrying out the invention.

In the drawings:

FIG. 4 is a transverse section of the turbulence-producing means taken on line 4—4 of FIGURE 1.

Figure 1:
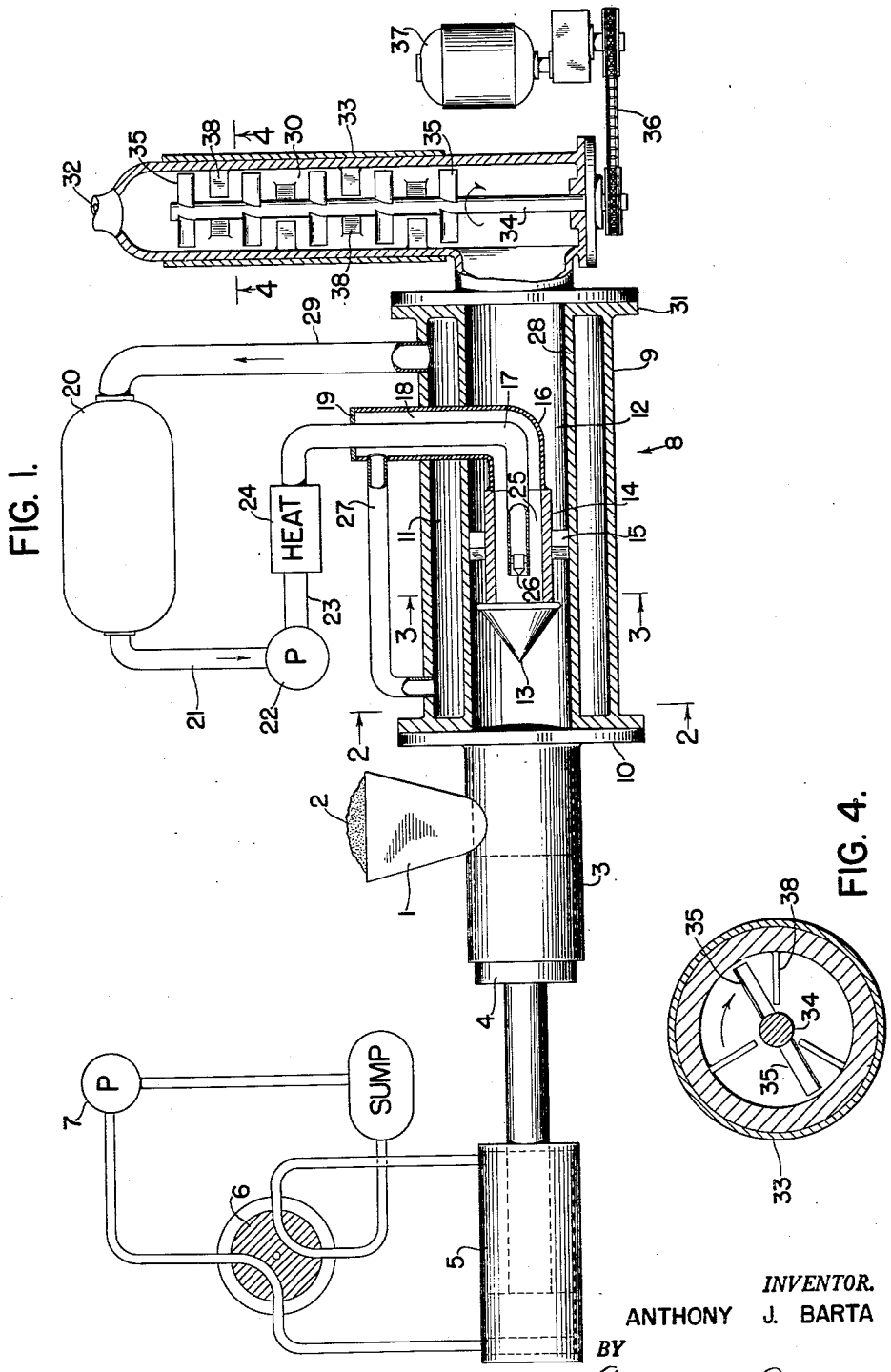
FIGURE 1 is a vertical longitudinal section through an apparatus constructed in accordance with the invention, shown somewhat schematically.
Figure 2:
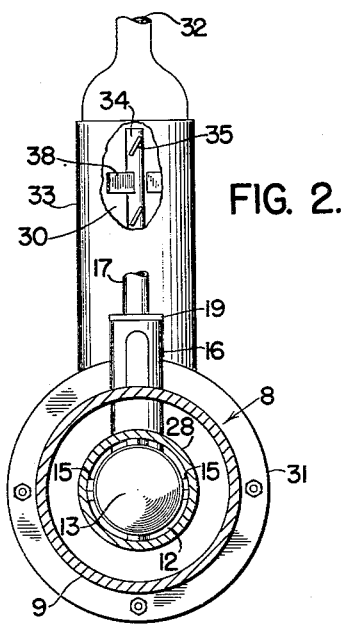
FIG. 2 is a vertical section of the apparatus taken on line 2—2 of FIGURE 1.

As best shown in FIGURE 1 of the drawings, the apparatus comprises a tapered hopper 1 into which is fed the raw material 2 to be continuously plasticized. Material 2 comprises small hard chunks or pellets of the base plastic, such as polyethylene of the type having high viscosity at its melt point. The melt index of this plastic material may be generally between 0.7 and 22. Mixed with the plastic pellets, and in finely divided dry form, is a filler of an inorganic material or the like which may be incompatible with the plastic. The heterogeneous plastic-filler mixture is relatively easily flowable when in dry form. As used in this application, the word incompatible means that the filler is disposed in and does not join chemically with the plastic carrier.

Hopper 1 is adapted to feed material 2 by gravity into the forward portion of a pressure cylinder 3 to which the hopper is secured in any suitable way. Cylinder 3 contains a ram 4 which is actuated by a high pressure feed cylinder 5 connected thereto and with the latter connected through an actuating valve 6 to a suitable source 7 of fluid pressure, shown schematically.

Initially, ram 4 is disposed at the left of cylinder 3, permitting a relatively large amount of material 2 to feed into the cylinder. Actuation of valve 6 will cause cylinder 5 to move ram 4 rightwardly under high pressure, thus forcing the heterogeneous mixture from cylinder 3 into a plasticizing chamber, indicated generally at 8.

Chamber 8 comprises a longitudinally extending circular heating jacket 9 secured at one end to the flanged end 10 of cylinder 3. Jacket 9 is adapted to receive a heating medium, as will be described, and includes an outwardly disposed annular space or chamber 11 and central inner chamber 12.

As the mixture 2 is forced from cylinder 3, it enters inner chamber 12 and travels longitudinally therealong until it engages the conical end portion 13 of an annular hollow torpedo-like member 14 disposed in the path of the mixture. Member 14 is mounted concentrically within chamber 12 by any suitable means, and is supported in spaced relation from the walls thereof by a plurality of spacer blocks 15 disposed therebetween. As shown in FIGURE 1, torpedo member 14 is preferably somewhat shorter than chamber 12, a ratio of 4/5 being found suitable.

The end of member 14 opposite cone 13 is connected by welds or the like to a heat-carrying duct 16 which makes a 90° bend adjacent member 14 and passes outwardly through jacket 9. Duct 16 carries a centrally disposed inlet pipe or conduit 17 therethrough with pipe 17 forming an annular passage 18 with the duct wall. Pipe 17 passes outwardly through a closure plate 19 sealably mounted on the end of duct 16 and is connected to a source of high temperature heating medium.

The heating medium may be oil which is stored in a tank 20 having an outlet connected through a pipe 21 to a suitable pump 22 of well-known type. Pump 22 operates to withdraw oil from tank 20 and pass it through a pipe 23 to an oil heater 24 of any suitable electric or other well-known type. It has been found that the oil should be heated to a temperature providing a final working temperature of 475° F.

While oil has been described as the heating medium, it may also be possible to utilize steam, electricity or other means.

Inlet pipe 17 is shown as being connected to the outlet of heater 24.

The inner end of pipe 17 extends axially within torpedo 14 to form a chamber 25 and terminates adjacent cone 13, and has a tapered dispersion block 26 disposed just within its open end and spaced from the pipe walls.

During operation of the apparatus, hot oil is pumped inwardly through pipe 17 and passes outwardly from the end thereof and initially flows into engagement with the inner concave surface of cone 13 to heat the latter. Block 26 is disposed and shaped to give a slight radially outward direction to the oil flow to facilitate return flow of the oil through chamber 25 and passage 18.

A pipe 27 connects the outer end of passage 18 adjacent closure plate 19 with outer chamber 11 of jacket 9, so that hot oil flows from torpedo 14 to chamber 11. It can thus be seen that the heating action of the oil is applied to both the torpedo body or wall and the longitudinal inner wall 28 of the jacket.

After passing through chamber 11, the oil passes outwardly through a pipe 29 and returns to the inlet side of tank 20 for subsequent heating and recirculation.

Under the action of ram 4, the relatively cool mixture 2 enters chamber 12 and is initially heated slightly on contacting wall 28. This heating action may be enough to slightly soften the plastic, but is not enough to make it flowable as a fluid. Mixture 2 then engages the conical end member 13 and is forced radially outwardly from the central apex thereof in all directions along the heated surface thereof and into the annular space between the torpedo wall and wall 28.

Since the hot oil enters the working area adjacent cone 13, the latter will provide the highest temperature available and will soften the mixture to an almost fluid flowable form so that it can flow rearwardly over the torpedo with relative ease.

As the now substantially softened mixture continues on, it is subjected to additional heating from both sides by the torpedo wall and wall 28 which increases the heating surface area and substantially increases the heat flow therethrough. This heating softens the plastic to the maximum consistency desired.

Spacer blocks 15 serve to disperse or mix material 2 to some extent as it is forced by them, but the filler is usually still not mixed into the flowing plastic to the point of having a substantially homogeneous substance. Further mixing is often necessary, especially when a plastic having high viscosity is being treated.

The heated substance is therefore forced from chamber 12 into a closed turbulence chamber 30 having a lower wall portion communicating with chamber 12 by a connection with a flanged end portion 31 of jacket 9. Material 2 is forced through the restricted space formed by chamber 30 and finally is discharged at the upper outlet 32 thereof.

While in chamber 30, the partially mixed material is maintained at a desirable high temperature by a suitable electric heating jacket 33 or the like which surrounds the chamber. The material is also subjected to substantial turbulence by the following means, shown in FIGS. 1 and 4.

An axially extending rotatable shaft 34 extends longitudinally within chamber 30 and is provided with a plurality of spaced mixing paddles 35. The lower end of shaft 34 passes through the chamber end and is rotatably driven to turn paddles 35 by a chain and sprocket drive 36 from a suitable motor 37.

Paddles 35 are constructed with a reverse or backward pitch for the normal direction of rotation of shaft 34, which is clockwise, so that as the material 2 is forced forwardly by ram 4 the paddles tend to force the material backwardly. The viscosity of the melted plastic is insufficient to overcome the turbulent action thus created. Additional turbulence is created by a plurality of vertically spaced baffle studs 38 mounted on the chamber wall and extending inwardly between paddles 35.

The entire effect of the action within chamber 30 is to thoroughly mix the plastic and fibers or filler into a substantially homogeneous mixture.

Figure 5:
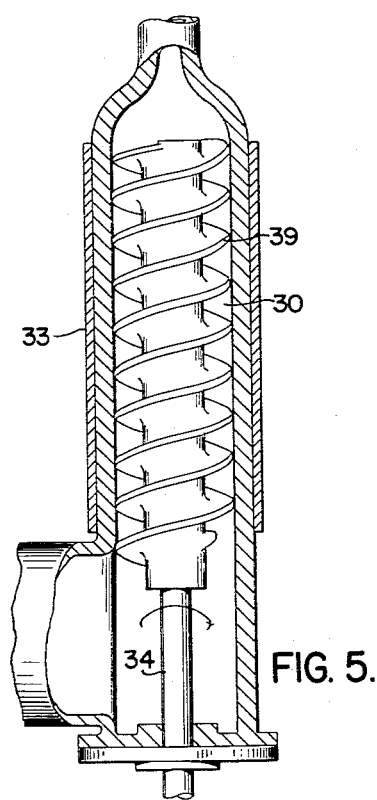
FIG. 5 is a vertical section of another embodiment of the turbulence-producing means.
Figure 3:
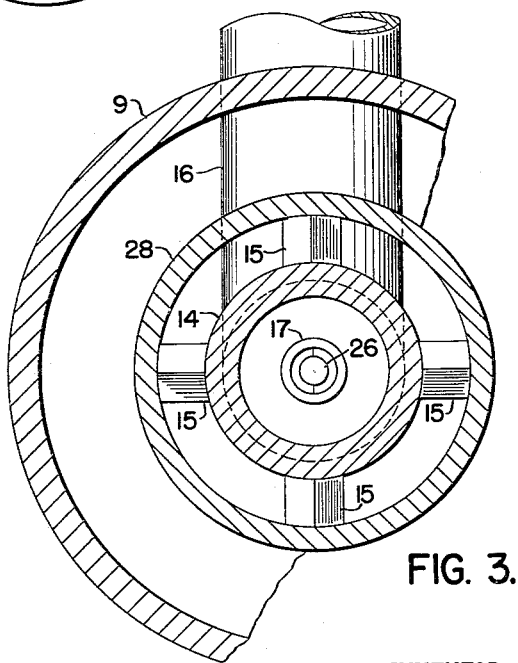
FIGURE 3 is a transverse section of the conical torpedo-like member taken on line 3—3 of FIGURE 1.

If the plastic utilized does not have too high a viscosity at working temperatures, it may be possible to use a direct screw 39 (FIG. 5) within chamber 30. The screw will provide a certain but smaller amount of turbulence which may be sufficient in some instances for mixing purposes.

The invention solves the problem of thoroughly dispersing incompatible fillers in a thermoplastic and provides a novel apparatus for doing so.

Various modes of carrying out the invention are contemplated as being within the scope of the following claim particularly pointing out and distinctly claiming the subject matter which is regarded as the invention.

I claim:

Apparatus for homogeneously dispersing an incompatible filler in a thermoplastic material, comprising, a chamber having a longitudinally extending wall, a hollow torpedo-like member having a body portion spaced inwardly from the wall of said chamber by a plurality of support members, said torpedo-like member having a generally conical front end portion facing the entrance to said chamber and with the apex of said end portion being disposed centrally of the chamber, a source of fluid heating medium, a first conduit member extending from said source through the wall of said chamber and into said torpedo-like member at the rear end thereof and extending to adjacent said conical end portion, a dispersion block disposed at the inner end of said first conduit means and with said block constructed to disperse fluid flowing from said first conduit means in a generally radially outward direction against the inner concave surface of said conical end portion, second conduit means passing from the inner front end portion of said torpedo-like member and between said first conduit means and said body portion to a heating space surrounding said chamber wall, means to force said fluid heating medium through said first and then said second conduit means so that said conical end portion will be heated to a higher temperature than said body portion and said chamber wall; feeding means to force a heterogeneous mixture of said material and filler through said chamber whereby said mixture will be forced outwardly from the center of said chamber to adjacent the walls thereof by said conical end portion and initially heated by the latter, and whereby said mixture will be forced between said chamber wall and said body portion and the filler will be at least partially dispersed in said material by said support members; and turbulence producing means connected to the discharge end of said chamber and with said turbulence producing means including mechanism to apply reverse mechanical forces to material flowing therethrough from said chamber.

References Cited in the file of this patent

UNITED STATES PATENTS

| | | |
|---|---|---|
| 2,476,272 | Bauman | July 19, 1949 |
| 2,486,346 | Wachs | Oct. 25, 1949 |
| 2,680,880 | Corbett | June 15, 1954 |
| 2,798,256 | Eynard | July 9, 1957 |
| 2,814,827 | Snow | Dec. 3, 1957 |
| 2,863,649 | Grubb | Dec. 9, 1958 |